(12) United States Patent
Kanai (10) Patent No.: US 7,117,317 B2
(45) Date of Patent: Oct. 3, 2006

(54) APPARATUS AND METHOD FOR EFFICIENT STORAGE OF DATA STREAMS THAT EACH COMPRISE SEPARATELY TRANSMITTED DATA BLOCKS

(75) Inventor: Hirokazu Kanai, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 389 days.

(21) Appl. No.: 10/476,012

(22) PCT Filed: Feb. 14, 2003

(86) PCT No.: PCT/JP03/01598

§ 371 (c)(1),
(2), (4) Date: Oct. 27, 2003

(87) PCT Pub. No.: WO03/073721

PCT Pub. Date: Sep. 4, 2003

(65) Prior Publication Data

US 2004/0193780 A1   Sep. 30, 2004

(30) Foreign Application Priority Data

Feb. 28, 2002   (JP) .............................. 2002-052840

(51) Int. Cl.
*G06F 13/00* (2006.01)

(52) U.S. Cl. ...................................... 711/154; 711/157

(58) Field of Classification Search ................. 711/154, 711/157
See application file for complete search history.

(56) References Cited

FOREIGN PATENT DOCUMENTS

| JP | 08018604 | 1/1996 |
|---|---|---|
| JP | 08030504 | 2/1996 |
| JP | 08297623 | 11/1996 |
| JP | 09018473 | 1/1997 |
| JP | 2001/111955 | 4/2001 |
| JP | 2001/144817 | 5/2001 |
| JP | 2001/195299 | 7/2001 |
| JP | 2002/084311 | 3/2002 |
| JP | 2002/084316 | 3/2002 |
| JP | 2002/164939 | 6/2002 |

OTHER PUBLICATIONS

PCT International Search Report dated May 27, 2003.
3 GPP TS 25.212 V3.8.0 (Dec. 2001), 3rd Generation Partnership Project; Technical Specification Group Radio Access Network; Multiplexing and channel coding (FDD) (Release 1999), pp. 1-62.

*Primary Examiner*—Reba I. Elmore
(74) *Attorney, Agent, or Firm*—Stevens, Davis, Miller & Mosher, LLP (57) ABSTRACT

A storage apparatus and method may store received data streams that each have data blocks distributed over a plurality of transmission frames. Adjacent memory addresses are allocated to store the data streams. For each data stream, a set of adjacent allocated memory addresses is assigned to store the corresponding data blocks such that sets having adjacent memory addresses are assigned to the data streams in an order of the data streams defined by a descending number of frames containing a data block of the respective data stream. Data of each received data block are stored at the assigned memory addresses of the storage component as each data block is received. The set of memory addresses assigned to each data stream are de-allocated, after the stored data stream is retrieved, such that the sets of memory addresses are de-allocated in the reverse order they were assigned to the data streams.

4 Claims, 8 Drawing Sheets

APPARATUS AND METHOD FOR EFFICIENT STORAGE OF DATA STREAMS THAT EACH COMPRISE SEPARATELY TRANSMITTED DATA BLOCKS

TECHNICAL FIELD

The present invention relates to an apparatus and method for storage.

BACKGROUND ART

In a radio communication, data is transmitted in units of a certain time frame called a "radio frame." When a series of data is transmitted, the smaller the proportion of continuous errors (burst errors) in the transmission time of this data, the higher accuracy in error correction can be obtained on the receiving side. Therefore, this data maybe mapped to a plurality of radio frames and transmitted. In the 3GPP (3rd Generation Partnership Project) specification in particular, 1, 2, 4 or 8 radio frames are used according to the types and number of data pieces to send a series of data pieces.

When a plurality of types of data is transmitted simultaneously, data pieces to be mapped to the same radio frame are combined and a string of combined data pieces is mapped to the radio frame. Here, the data pieces to be transmitted simultaneously are not always transmitted with the same number of radio frames. That is, when for example, two kinds of data are transmitted, one type of data may be transmitted with two radio frames and the other type of data may be transmitted with four radio frames.

The data on the radio frames transmitted as described above is demodulated frame by frame at a reception apparatus and when a plurality of data pieces is combined, the data is divided into their respective data pieces and stored in a storage apparatus such as a memory for each data. When received data is the one sent with one frame, a series of data pieces has been received when one frame of data is received, and therefore the data stored in the storage apparatus is read at this point in time and subsequent processing such as frame combination and forward error correction is carried out. On the other hand, when received data is the one sent with a plurality of frames, a series of data pieces has not been received yet when one frame of data is received, and therefore data pieces to be received with subsequent radio frames are stored one by one in the storage apparatus. Then, after all radio frames including the series of data pieces is received, the data stored in the storage apparatus is read and subjected to subsequent processing such as frame combination and forward error correction.

In this process, there are various methods of securing storage areas to store the received data pieces in a storage apparatus such as a method of securing storage areas for the received data pieces in the order in which they are received or a method of securing storage areas corresponding in number to radio frames including their respective data pieces.

However, in the case of the method of securing storage areas for received data pieces for each radio frame in the order in which they are received, a series of data pieces spanning a plurality of frames is stored separately for every frame and at the same time a complete series of data is read from the storage apparatus for subsequent processing and the area where the relevant data was stored becomes a free space, which causes the area used in the storage apparatus to become thinned out, resulting in a problem that the required storage capacity increases.

Furthermore, in the case of the method of securing storage areas corresponding in number to radio frames including the relevant data pieces, when there is a plurality of data pieces spanning a plurality of radio frames, the area used in the storage apparatus may become thinned out as in the above described case resulting in a problem that the required storage capacity increases.

Specific examples of these problems will be explained with reference to FIGS. 1 to 3 below.

Figure 1:
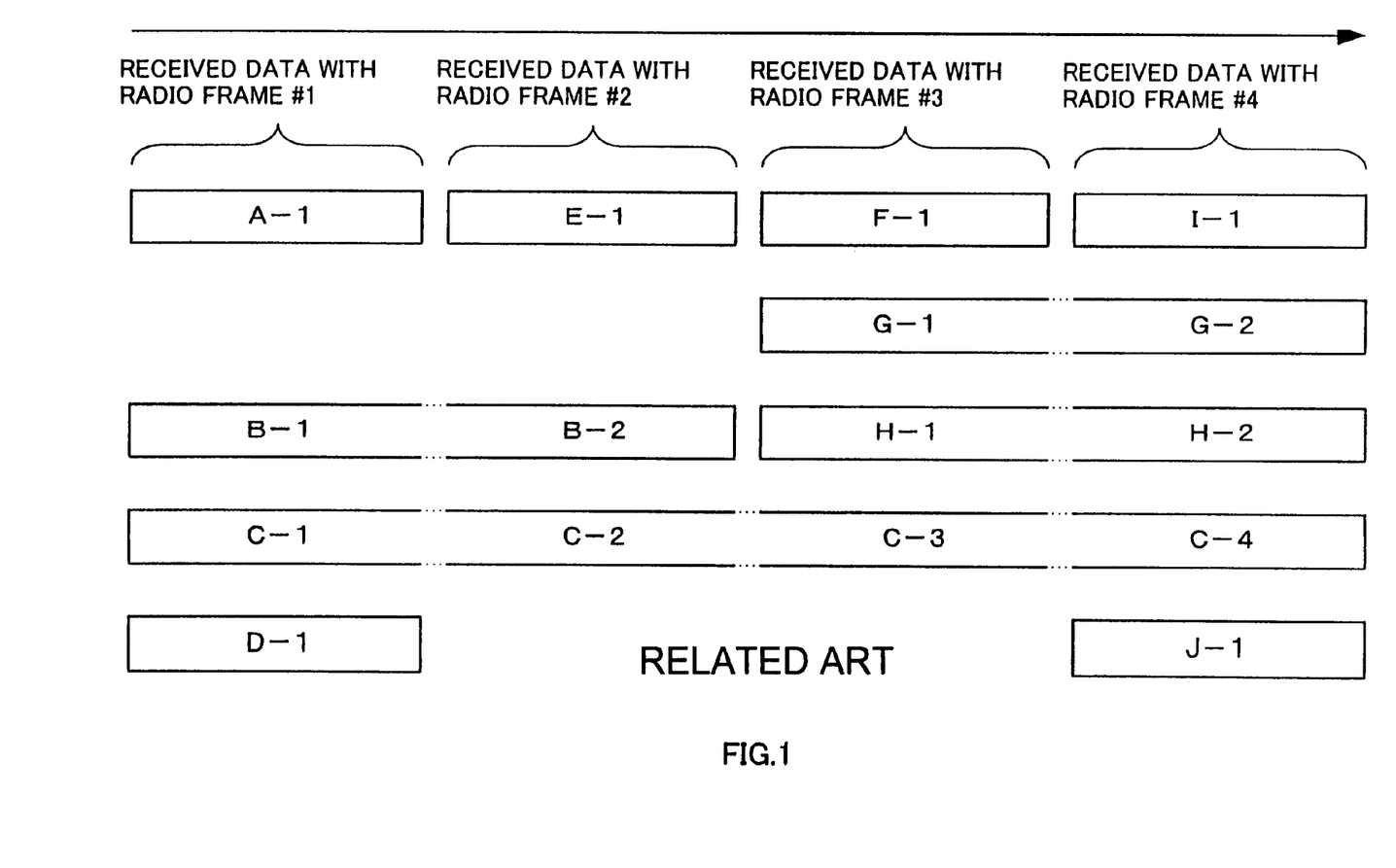
FIG. 1 illustrates a configuration example of radio frames each transmitting a plurality of data pieces.

FIG. 1 illustrates a configuration example of radio frames that transmit a plurality of data pieces. As shown in the figure, data pieces A to J are transmitted with radio frames #1 to #4 and the radio frame #1 transmits the parts corresponding to the 1st frames of the data pieces A to D. Furthermore, the radio frame #2 transmits the part corresponding to the 1st frame of the data piece E and the parts corresponding to the 2nd frames of the data pieces B and C. In the like manner, the radio frames #3 and #4 transmit their respective data pieces. In the case of the data pieces A, D, E, F, I and J, one frame carries their complete set of data, while in the case of the data pieces B, G and H, two frames carry their complete set of data and in the case of the data piece C, four frames carry a complete series of data.

Figure 2:
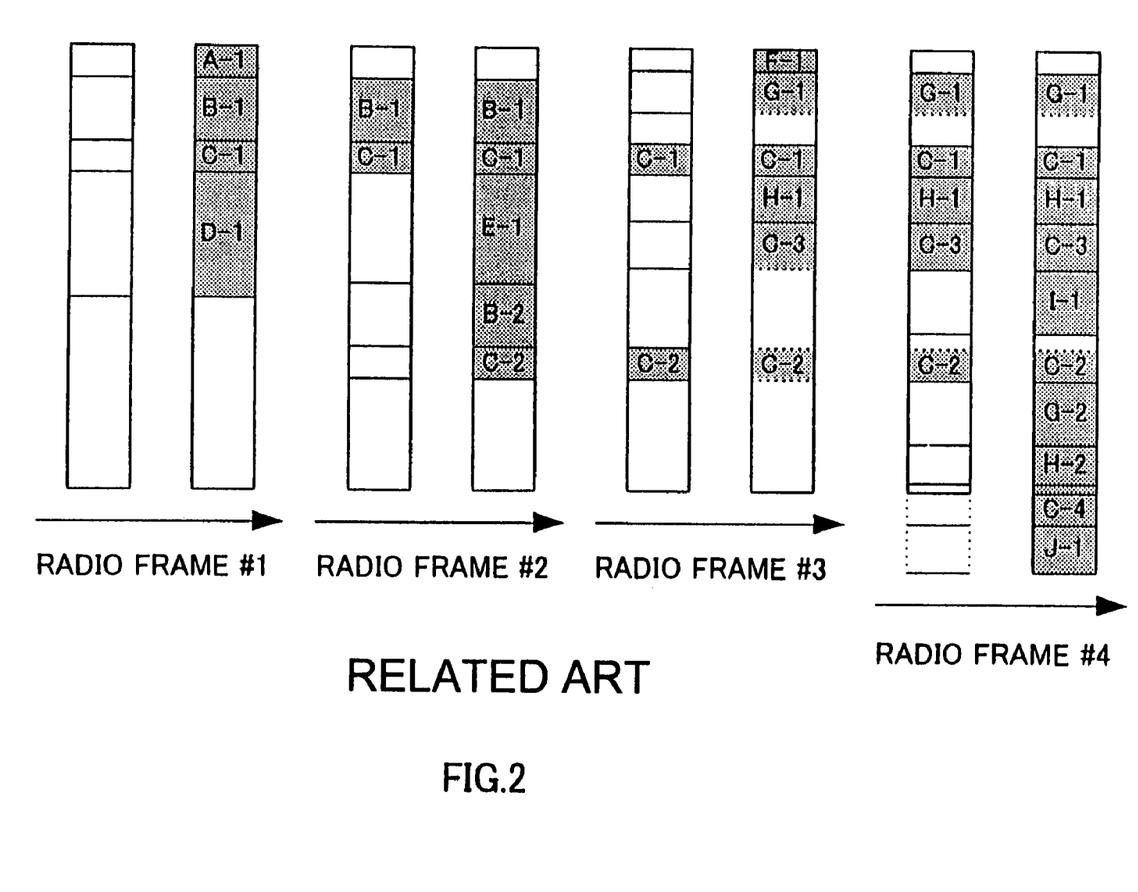
FIG. 2 illustrates an example of a conventional data storage operation.

When storage areas are secured for the data pieces transmitted in this way in the order in which they are received, the state of the areas used is as shown in FIG. 2. As shown in FIG. 2, with the radio frame #1 the storage areas are secured for the parts corresponding to the 1st frames of the data pieces A to D which are stored one by one. The data pieces A and D which have their complete set of data with only the radio frame #1 are read for the subsequent processing and the areas of the data pieces A and D are released. In the case of the radio frame #2, storage areas are secured for the part corresponding to the 1st frame of the data piece E and parts corresponding to the 2nd frames of the data pieces B and C, which are stored one by one. At this time, the part in which the data piece A was stored was released and remains free, but since the amount of data of the parts corresponding to the 2nd frames of the data pieces B and C and the amount of data of the part corresponding to the 1st frame of the data piece E are greater than the data piece A, it is not possible to store the parts of the data pieces B, C and E using only this free space. Furthermore, if the parts of the data pieces B, C and E are divided and the above described free space is used for them, controlling these storage areas would be very complicated.

Likewise, storage areas are secured for the respective data pieces in the order in which they are received and the data pieces are stored. Here, for example, when the data included in the radio frame #3 is stored, the data C is stored in different pieces away from one another though they constitute a series of data pieces. Because of this, the processing when outputting a series of data pieces for subsequent processing becomes complicated. Furthermore, when even the data included in the radio frame #4 is stored, the areas used are thinned out, which prevents effective use of storage areas and increases the required storage capacity.

Figure 3:
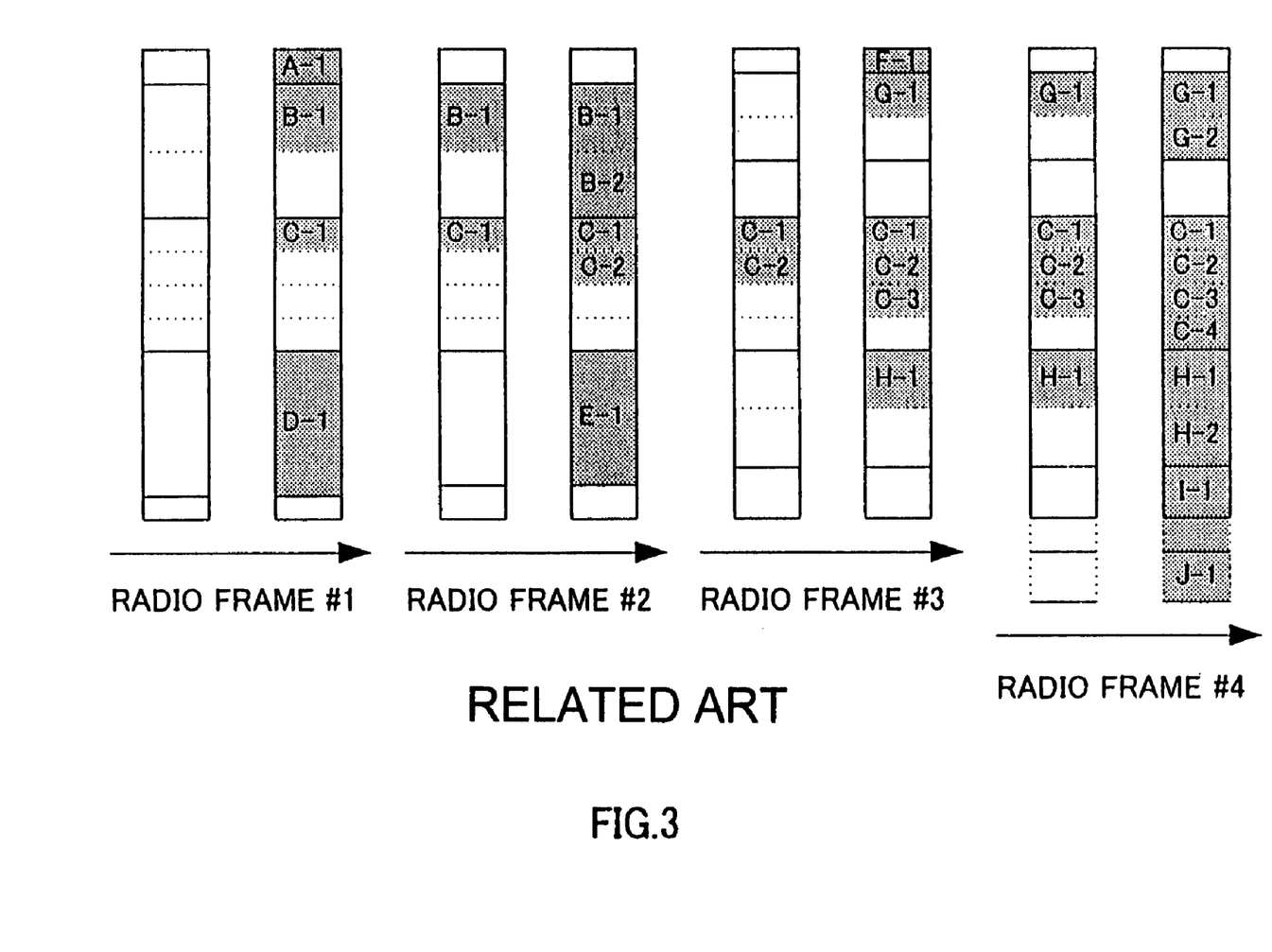
FIG. 3 illustrates another example of the conventional data storage operation.

Furthermore, the state of the areas used when storage areas corresponding in number to the radio frames including the respective data pieces shown in FIG. 1 are secured and the data pieces are stored is as shown in FIG. 3. As shown in FIG. 3, in the case of the radio frame #1, storage areas are secured for the data pieces A to D according to the number of radio frames that include these data pieces, and these data pieces are then stored. That is, storage areas corresponding to one frame for the data pieces A and D, two frames for the data piece B and four frames for the data piece C are secured. The data pieces A and D which have their complete set of data with only the radio frame #1 are read for the subsequent processing and the areas for the data pieces A and D are released. In the case of the radio frame #2, the parts corresponding to the 2nd frames of the data pieces B and C are stored in the secured areas and for the data piece E, a storage area corresponding to one frame is secured and the data piece E is stored there. At this time, the part in which the data piece A was stored was released and remains free, but since the amount of data of the part corresponding to the 1st frame of the data piece E is greater than the data piece A, it is not possible to use this free space.

Then, storage areas are secured for all the relevant data pieces when the start frame of each data piece is stored in the like manner. In this case, too, when, for example, data pieces up to the ones included in the radio frame #4 are stored, the areas used remain thinned-out, which prevents effective use of storage areas and increases the required storage capacity.

DISCLOSURE OF INVENTION

It is an object of the present invention to suppress an increase in the storage capacity for storing data even when one frame includes a plurality of data pieces and a series of data pieces is transmitted with a plurality of frames.

The present inventor has noticed the fact in, for example, the 3GPP specification (3GPP Technical Specification: 3GPP TS 25.212 Version 3.8.0 Section 4.2.14) that serial numbers (frame numbers) are assigned to individual radio frames and when a series of data pieces is transmitted, a radio frame whose frame number is divided by the number of radio frames used for transmission of the respective data pieces with the remainder being 0 becomes the start frame and data pieces are mapped only from this start frame. That is, the present inventor has noticed the fact that, for example, data pieces transmitted with two radio frames are transmitted with a radio frame whose frame number is an even number as the start frame, while data pieces transmitted with four radio frames are transmitted with a radio frame whose frame number is a multiple of 4 as the start frame. The present inventor then found that the start frame of data pieces transmitted with a plurality of radio frames always becomes the start frame for the data pieces transmitted with fewer radio frames than the radio frames which transmit those data pieces and that a final frame of data pieces transmitted with a plurality of radio frames always becomes the final frame of the data pieces transmitted with fewer radio frames than the radio frames which transmit those data pieces.

Then, the present inventor has come up with the present invention by discovering that when the start frame of each data piece is stored, it is possible to prevent areas used from becoming thinned out by securing storage areas necessary to store the respective data pieces in descending order of the number of radio frames which transmit a series of data pieces. That is, the present inventor has come up with the present invention by discovering that the final frame of data transmitted with, for example, four frames is always the final frame of data transmitted with one or two frames, and therefore when data storage areas are secured, storage areas are secured for 4 frames, 2 frames and 1 frame for data transmitted with 4 frames, data transmitted with 2 frames and data transmitted with 1 frame in that order and when the area for the data transmitted with 2 frames is released, the data always transmitted with 1 frame is released and when the area for the data transmitted with 4 frames is released, the data always transmitted with 2 frames and 1 frame is released, and therefore it is possible to store data without creating useless free spaces.

That is, the subject matter of the present invention is to assign, when a plurality of data pieces is stored in a storage apparatus, storage areas corresponding in number to radio frames to the series of data pieces in descending order of the number of radio frames used to transmit the series of data pieces and secure the storage areas.

One mode of the present invention has a configuration comprising a storage section which stores a plurality of data pieces and a control section which causes the storage section to secure storage areas corresponding to their respective data pieces of the plurality of data pieces in descending order of the entire data time length.

According to another mode of the present invention, the storage apparatus is the one for storing a plurality of data pieces when at least one data piece is transmitted with a plurality of frames, comprising a storage section which stores the plurality of data pieces and a control section which causes the storage section to secure storage areas corresponding to their respective data pieces of the plurality of data pieces in descending order of the number of frames.

According to a further mode of the present invention, the storage method is the one for storing a plurality of data pieces comprising a step of securing storage areas corresponding to their respective data pieces of the plurality of data pieces in descending order of the entire data time length, a step of storing the respective data pieces in the secured areas and a step of outputting, when the plurality of data pieces include data pieces whose entire data is stored, those data pieces and releasing the storage area for those data pieces.

According to a still further mode of the present invention, the storage method is the one for storing a plurality of data pieces when at least one data piece is transmitted with a plurality of frames, comprising a step of securing storage areas for the plurality of data pieces in descending order of the number of frames, a step of storing the respective data pieces in the secured storage areas and a step of outputting, when the plurality of data pieces include data pieces whose entire data is stored, those data pieces and releasing the storage areas for those data pieces.

BEST MODE FOR CARRYING OUT THE INVENTION

With reference now to the attached drawings, an embodiment of the present invention will be explained in detail below.

Figure 4:
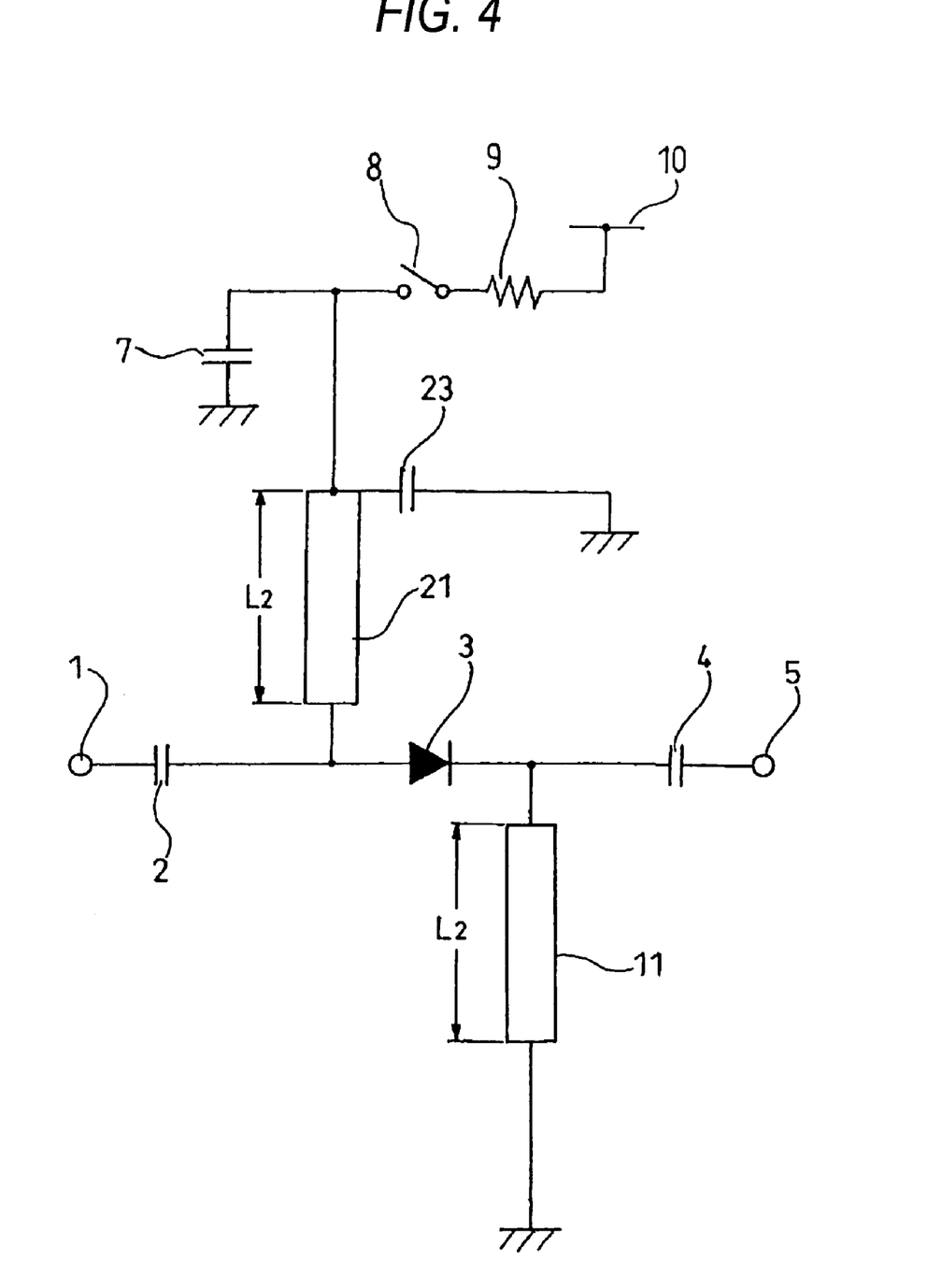
FIG. 4 is a block diagram showing a configuration of a transmission apparatus according to an embodiment of the present invention.

FIG. 4 is a block diagram showing a configuration of a transmission apparatus according to an embodiment of the present invention. In FIG. 4, a coding section 100 encodes transmission data. A modulation section 200 modulates the coded transmission data. A radio transmission section 300 performs predetermined radio transmission processing on the modulated transmission data and sends the data from a transmission antenna.

Furthermore, an error correcting/detection coding section 110 performs error detection coding and error correcting coding on the transmission data. A rate matching section 120 performs data replication or thinning-out on the transmission data subjected to the error correcting coding and adjusts the number of data pieces (rate matching). An interleaver 130 interleaves (changes the sequence of) the transmission data after the rate matching. A frame division section 140 divides the interleaved transmission data into a predetermined number of radio frames. A data combining section 150 combines, when a plurality of transmission data pieces is sent, the plurality of transmission data pieces for every one frame. A frame interleaver 160 interleaves transmission data for every one frame. A radio frame mapping section 170 maps the transmission data to the radio frames.

Figure 5:
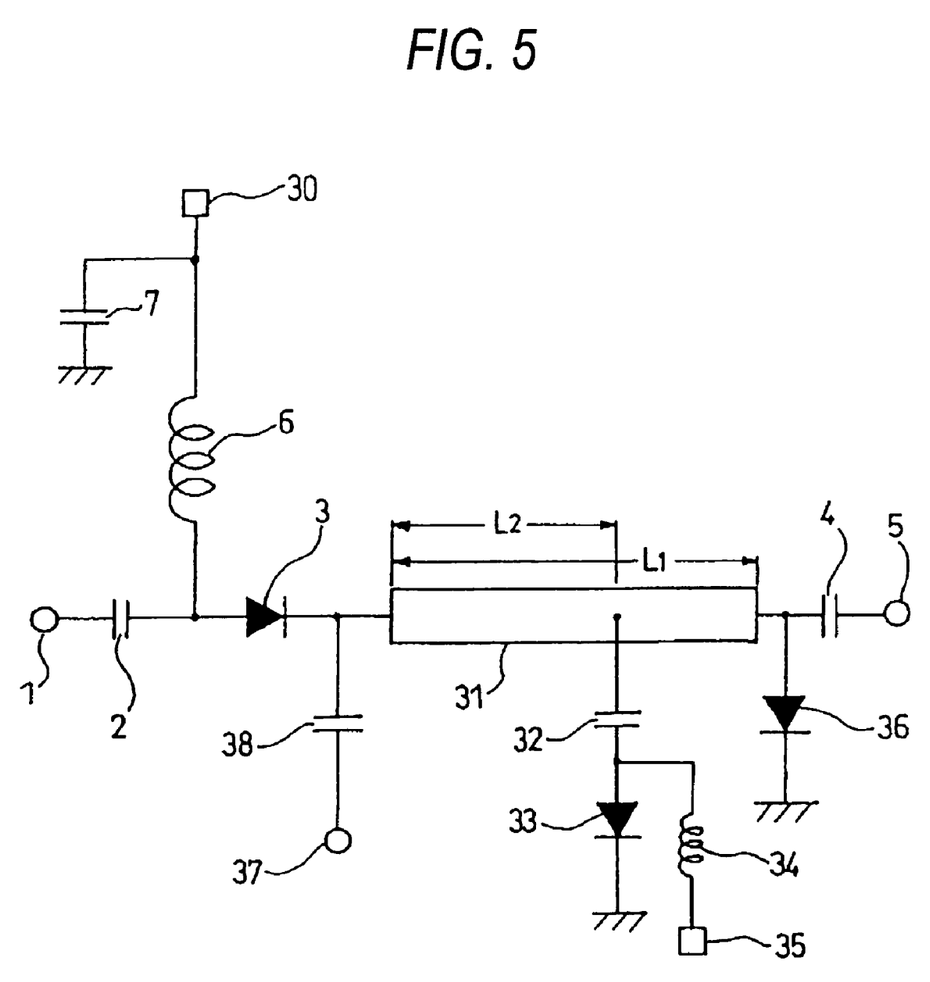
FIG. 5 is a block diagram showing a configuration of a reception apparatus according to the embodiment.

FIG. 5 is a block diagram showing a configuration of a reception apparatus according to the embodiment of the present invention. The reception apparatus shown in the figure receives data transmitted from the transmission apparatus shown in FIG. 4. In FIG. 5, a radio reception section 400 performs predetermined radio reception processing on the data received through a reception antenna. A demodulation section 500 demodulates the data after the radio reception processing. A decoding section 600 decodes the demodulated received data and obtains decoded data.

Furthermore, a radio frame reconstruction section 610 stores the demodulated data and reconstructs data in units of radio frames. A frame deinterleaver 620 deinterleaves data in units of radio frames. Deinterleaving here is inverse transformation of the interleaving carried out by the frame interleaver 160 of the transmission apparatus shown in FIG. 4. When a plurality of data pieces is combined in one frame, a data division section 630 divides the combined data into the respective data pieces based on data identification information indicating a data division position, the number of divided data pieces and the number of radio frames, etc. Furthermore, when a series of data pieces is sent with a plurality of frames, the data division section 630 stores the respective data pieces until a complete series of data pieces is obtained. A frame combining section 640 combines a series of data pieces divided in units of radio frames. A deinterleaver 650 deinterleaves the combined series of data pieces. Deinterleaving here is inverse transformation of the interleaving carried out by the interleaver 130 of the transmission apparatus shown in FIG. 4. A rate dematching section 660 reconstructs the data rate-matched by the rate matching section 120 of the transmission apparatus using a predetermined method (rate dematching). An error correcting/detection decoding section 670 performs error correcting decoding and error detection decoding on the rate-matched data and thereby obtains decoded data.

Figure 6:
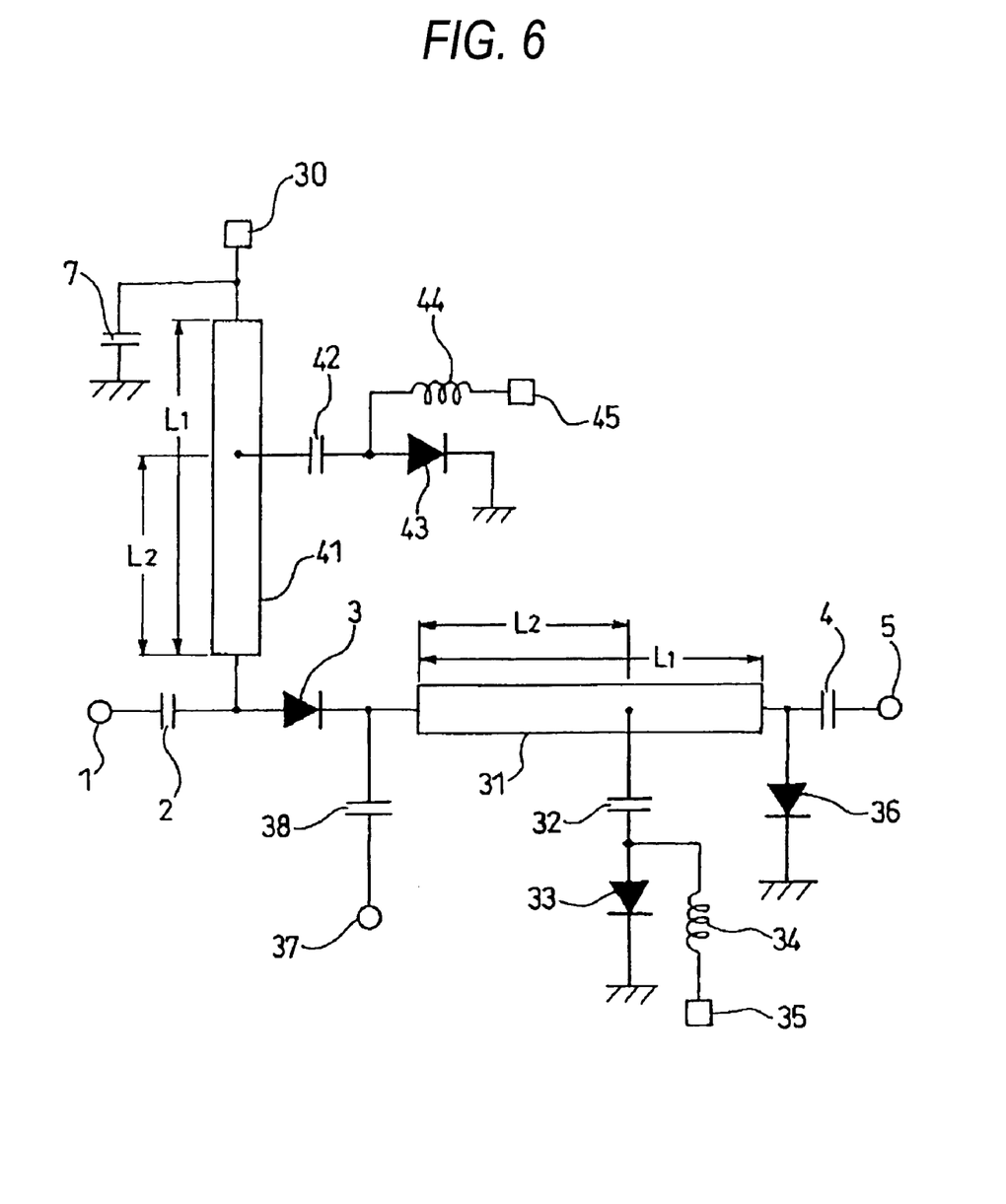
FIG. 6 is a block diagram showing a configuration of a data division section according to the embodiment.

FIG. 6 is a block diagram showing a configuration of the data division section 630. In FIG. 6, a data output control section 632 controls and at the same time outputs the data in units of radio frames deinterleaved by the frame deinterleaver 620 based on the data identification information using a method which will be described later. A storage section 634 temporarily stores the data output from the data output control section 632. When a complete series of data pieces is obtained, the storage section 634 outputs the data pieces to the frame combining section 640 and releases the storage areas in which the data pieces are stored.

Figure 7:
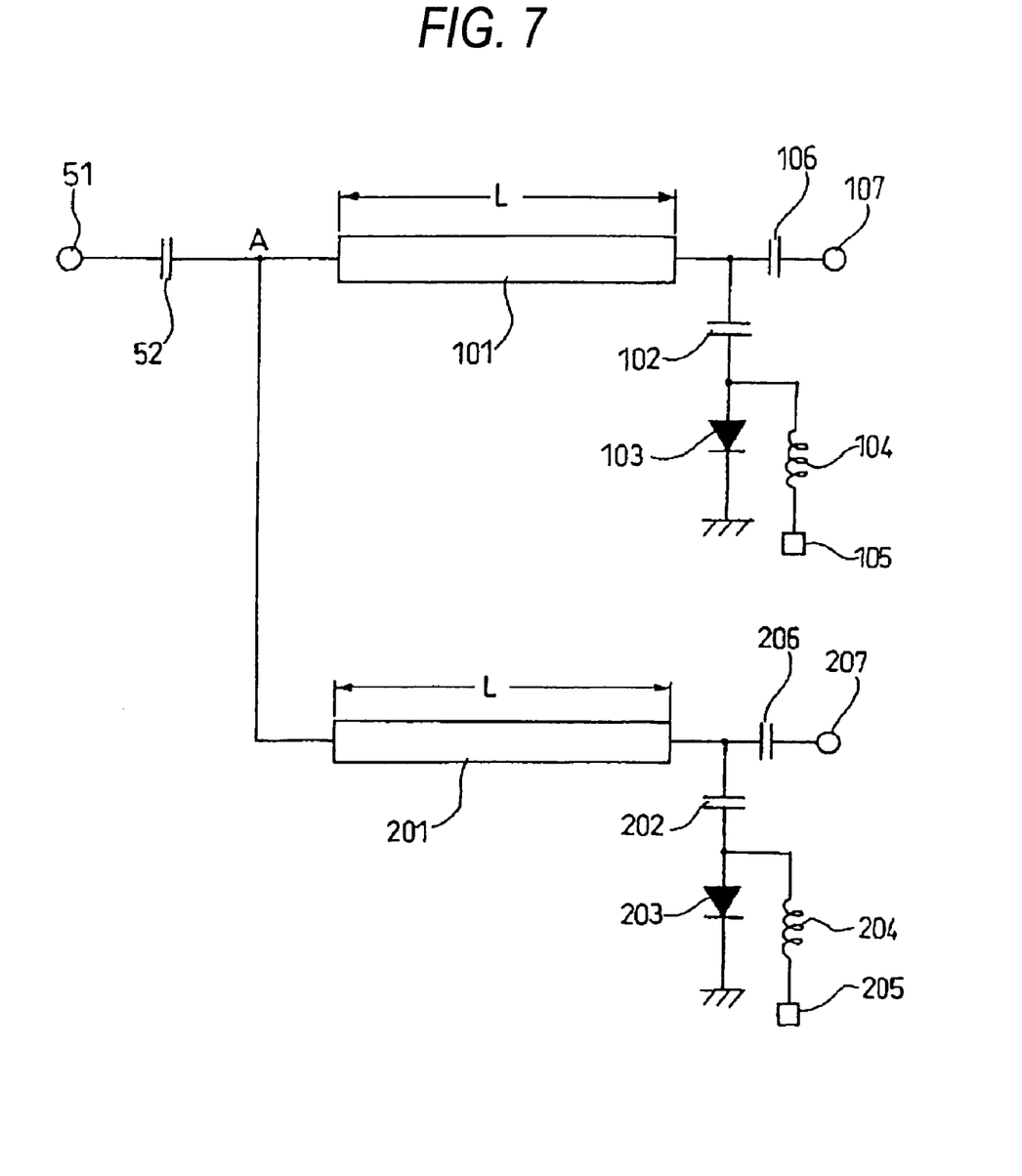
FIG. 7 is a flow chart showing a control method of a data output control section according to the embodiment.

Then, the output control method of the data output control section 632 will be explained using the flow chart shown in FIG. 7. FIG. 7 shows a processing flow of data corresponding to one frame and suppose this radio frame carries N types of data.

First, based on the data identification information, it is recognized how many types of data are included in one radio frame, with how many frames a series of data pieces is divided into frames for each type of data and the number of data pieces of the series of data pieces which have been divided into frames and transmitted (ST1000). The subsequent processing is roughly divided into three steps; an area securing step (ST1200 to ST1600), a data writing step (ST1800 to ST2100) and an area releasing step (ST2300 to ST2800).

The processing in the area securing step is carried out in descending order of the number of radio frames used to transmit a series of data pieces. That is, a parameter k for counting the processed data pieces of the N types of data pieces included in the radio frame is initialized to 1 (ST1100) and the data having the highest number of radio frames used to transmit the series of data pieces is selected as the data to be processed first (hereinafter referred to as "first data").

Then, with regard to the first data, it is decided whether the radio frame to be processed is the start frame to transmit a series of data pieces including the first data or not (ST1200).

Here, when this radio frame is not the start frame, the parameter k is incremented by 1 and the data having the second highest number of radio frames is selected as the data to be processed second (hereinafter referred to as "second data") (ST1500) Furthermore, it is decided whether the value of the parameter k is greater than the number of types of data pieces N transmitted by the radio frame to be processed or not (ST1600) and if the value of k is greater than N, the area securing step is finished and the process moves on to the data writing step. On the other hand, if the parameter k is equal to or smaller than the number of types of data N, the area securing step is repeated for the second data.

On the other hand, if the radio frame to be processed is the start frame, the storage area corresponding to the series of data pieces including the first data is secured in the storage section 634 (ST1300) and the value of a pointer P indicating the starting point of an area (free space) for which the storage section 634 is not secured is incremented by a value corresponding to the secured storage area, that is, the product of the number of data pieces Dk of the first data included in one frame and the number of frames Fk to transmit a series of data pieces (ST1400). Then, the parameter k is incremented by 1 and the data with the second highest number of radio frames used to transmit a series of data pieces (second data) is selected (ST1500). Furthermore, it is decided whether the value of the parameter k is greater than the number of data types N transmitted by the radio frame to be processed or not (ST1600) and if the value of k is greater than N, the area securing step is finished and the process moves on to the data writing step. On the other hand, if the parameter k is equal to or smaller than the number of data types N, the area securing step is repeated for the second data.

Since the data sequence in which data pieces are processed is not questioned in the data writing step, the parameter k is initialized to 1 first (ST1700) and an arbitrary data piece (first data) is selected from among a plurality of data pieces.

Then, the first data is divided from the radio frame (ST1800), the divided first data is written to the secured storage area (ST1900). Then, the parameter k is incremented by 1 and arbitrary data (second data) other than the first data is selected from among a plurality of data pieces (ST2000). Furthermore, it is decided whether the value of the parameter k is greater than the number of data types N to be transmitted by the radio frame to be processed or not (ST2100) and if the value of k is greater than N, the data writing step is finished and the process moves on to the area releasing step. On the other hand, if the parameter k is equal to or smaller than the number of data types N, the data writing step is repeated for the second data.

Since the data sequence in which data pieces are processed is not questioned for the processing in the area releasing step, either, the parameter k is initialized to 1 as with the data writing step (ST2200) and arbitrary data (first data) is selected from a plurality of data pieces.

Then, with regard to the first data, it is decided whether the radio frame to be processed is the final frame to transmit the series of data pieces including the first data or not (ST2300).

Here, if this radio frame is not the final frame, the parameter k is incremented by 1 and an arbitrary data piece (second data) other than the first data piece is selected from among a plurality of data pieces (ST2700) Furthermore, it is decided whether the value of the parameter k is greater than the number of data types N to be transmitted by the radio frame to be processed or not (ST2800) and if the value of k is greater than N, the area releasing step is finished and all processing is finished. On the other hand, if the parameter k is equal to or smaller than the number of data types N, the area releasing step is repeated for the second data.

On the other hand, if the radio frame to be processed is the final frame, a complete series of data pieces for the first data has been obtained in the storage section 634, and therefore the series of data including the first data is output to the frame combining section 640 (ST2400) and the recording area is released (ST2500). Furthermore, the value of the pointer P is decremented by a value corresponding to the released storage areas, that is, the product of the number of data pieces Dk of the first data included in one frame and the number of frames Fk to transmit a series of data pieces (ST2600). Then, the parameter k is incremented by 1 and arbitrary data other than the first data (second data) is selected from a plurality of data pieces (ST2700). Furthermore, it is decided whether the value of the parameter k is greater than the number of data types N transmitted by the radio frame to be processed or not (ST2800) and if the value of k is greater than N, the area releasing step is finished and all processing is finished. On the other hand, if the parameter k is equal to or smaller than the number of data types N, the area releasing step is repeated for the second data.

Then, a specific example of data storage in the storage section 634 will be explained using FIG. 1 and FIG. 8.

FIG. 1 shows an example of data pieces included in various frames when 10 types of series of data pieces A to J are transmitted, that is, when data pieces A, D, E, F, I and J with one frame, data pieces B, G and H with two frames and data piece C with four frames are transmitted. As shown in the same figure, with the radio frame #1, the portions corresponding to the first frame of data A, B, C and D (that is, data A-1, B-1, C-1 and D-1) are combined and transmitted. In the same way, with the radio frame #2, the portions corresponding to the second frame of data B and C (data B-2, C-2) and the portion corresponding to the first frame of data E (data E-1) are combined and transmitted. The same applies to the radio frames #3 and #4.

Here, since the frame number of the radio frame #1 is a multiple of 4 as described above, the radio frame #1 becomes the start frame to transmit the data C and at the same time becomes the start frame to transmit the data A, B and D (1 frame, 2 frames and 1 frame, respectively) which are transmitted with fewer radio frames.

Figure 8:
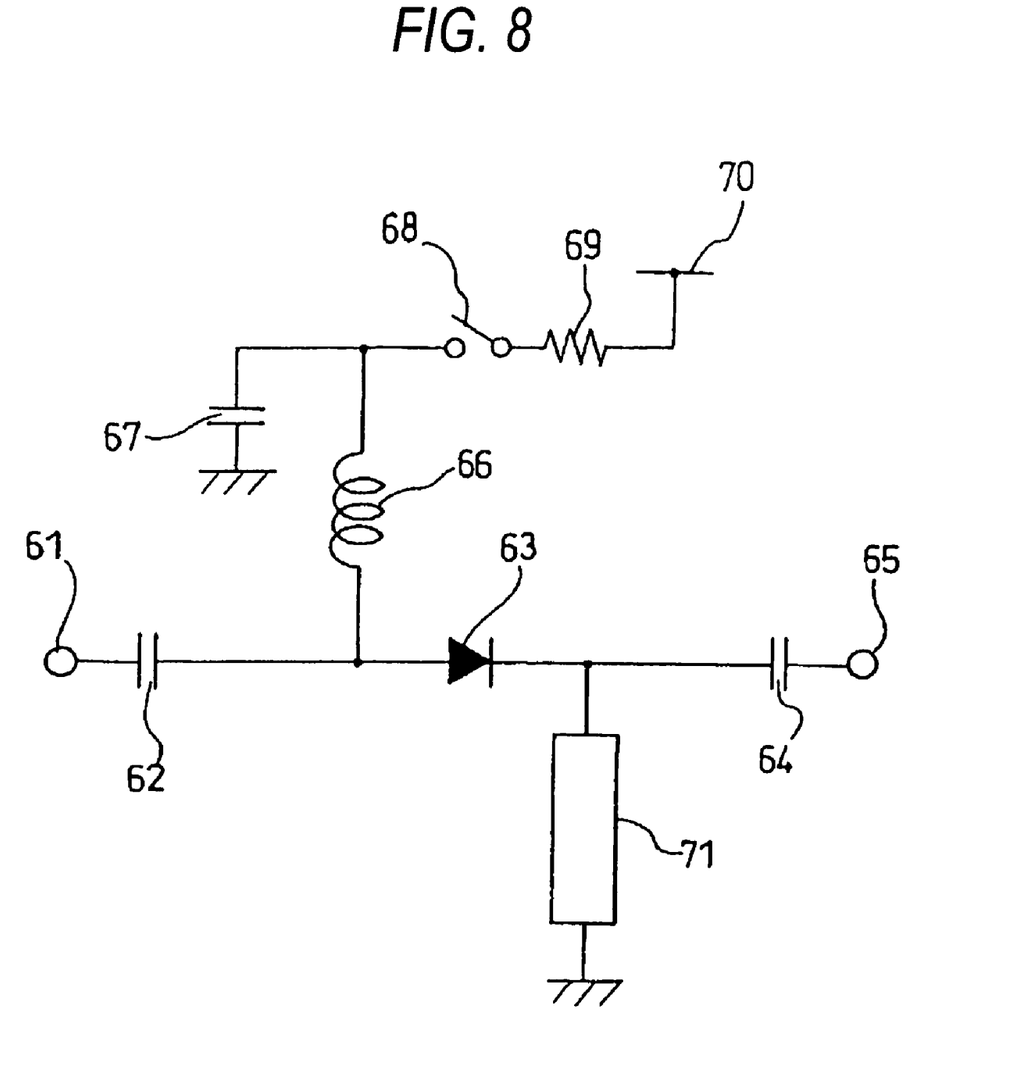
FIG. 8 illustrates a specific example of the data storage operation according to the embodiment.

FIG. 8 illustrates a state of the storage section 634 when the radio frames #1 to #4 transmitted as shown above are received by the reception apparatus of this embodiment.

First, when the radio frame #1 is received, based on the data identification information, the data output control section 632 recognizes that four types of data; the data A-1, B-1, C-1 and D-1 are included and corresponding series of data A, B, C and D are divided into frames; 1 frame, 2 frames, 4 frames and 1 frame, respectively. Then, for the series of data transmitted with the highest number of radio frames, that is, the data C which is transmitted with 4 frames, it is decided whether the radio frame #1 is the start frame or not.

Here, since the radio frame #1 includes the data C-1 and it is the start frame, an area 710 is secured to store the data C-1 to C-4. Likewise, an area 730 to store the data B-1 and B-2, an area 730 to store the data A-1 and an area 740 to store the data D-1 are secured one by one. At the same time, the value of the pointer P is incremented by a value corresponding to the secured storage areas.

Then, the data A-1, B-1, C-1 and D-1 included in the radio frame #1 are stored in the secured areas respectively and since the radio frame #1 is the final frame for the data A and D, the data A and D are output to the frame combining section 640 and then the areas 730 and 740 are released. At this time, the value of the pointer P is decremented by a value corresponding to the areas 730 and 740.

Then, when the radio frame #2 is received, for the data B, C and E included in the radio frame #2, it is decided whether the radio frame #2 is the start frame or not. Here, the data E-1 is included in the radio frame #2 and it is the start frame, and therefore an area 750 to store the data E-1 is secured. At the same time, the value of the pointer P is incremented by a value corresponding to the secured storage area.

Then, the data B-2 and C-2 are stored in the already secured storage areas while the data E-1 is stored in a newly secured storage area. For the data B and E, the radio frame #2 is the final frame, and therefore the data B and E are output to the frame combining section 640 and then the areas 720 and 750 are released. At this time, the value of the pointer P is decremented by a value corresponding to the areas 720 and 750.

Then, when the radio frame #3 is received, for the data C, F, G and H included in the radio frame #3, it is decided whether the radio frame #3 is the start frame or not. Here, since the radio frame #3 includes the data F-1, G-1 and H-1 and it is the first frame, areas 760 and 770 to store the data G-1 and G-2, and data H-1 and H-2 which are transmitted with two frames are secured first. Then, an area 780 to store the data F-1 transmitted with one frame is secured. At the same time, the value of the pointer P is incremented by a value corresponding to the secured storage areas.

Then, the data C-3 is stored in the already secured storage area while the data F-1, G-1 and H-1 are stored in newly secured storage areas. For the data F, the radio frame #3 is the final frame, and therefore the data F is output to the frame combining section 640 and then the area 780 is released. At this time, the value of the pointer P is decremented by a value corresponding to the area 780.

Then, when the radio frame #4 is received, for the data C, G, H, I and J included in the radio frame #4, it is decided whether the radio frame #4 is the start frame or not. Here, since the radio frame #4 includes the data I-1 and J-1 and it is the start frame, areas 790 and 800 to store the data I-1 and J-1 are secured. At the same time, the value of the pointer P is incremented by a value corresponding to the secured storage areas.

Furthermore, the data C-4, G-2 and H-2 are stored in the already secured storage areas while the data I-1 and J-1 are stored in newly secured storage areas. For the data C, G, H, I and J, the radio frame #4 is the final frame, and therefore after the data C, data G, data H, data I and data J are output to the frame combining section 640, all these areas are released and the value of the pointer P is decremented by a value corresponding to all these areas and the process returns to the initial state.

As shown above, according to the storage apparatus according to the embodiment of the present invention, areas to store a series of data are secured for a plurality of data pieces included in one frame in descending order of the number of radio frames used to transmit data, and therefore it is possible to store a series of data pieces in continuous minimum necessary storage areas without creating unnecessary free spaces and thereby prevent the storage capacity from increasing.

The above described embodiment has described the storage of radio frames through which a base station apparatus and communication terminal apparatus perform radio communication with each other, but the present invention is also applicable to various storage apparatuses for temporarily storing data such as a decoding apparatus which decodes received data and a storage apparatus used for cable transmission.

As described above, according to the present invention, even when a plurality of data pieces is included in one frame and a series of data pieces is transmitted with a plurality of frames, it is possible to suppress an increase in the storage capacity for storing data.

This application is based on the Japanese Patent Application No. 2002-052840 filed on Feb. 28, 2002, entire content of which is expressly incorporated by reference herein.

INDUSTRIAL APPLICABILITY

The present invention is applicable to a storage apparatus and a storage method.

What is claimed is:

1. A storage apparatus for storing a plurality of received data streams, each data stream comprising a plurality of data blocks that are distributed over and transmitted in a plurality of frames, the storage apparatus comprising:

a storage component that stores the plurality of data streams; and
a control component that controls how the plurality of data streams are stored in and retrieved from the storage component, wherein the control component:
(a) allocates adjacent memory areas of the storage component to store all data of the plurality of data streams;
(b) assigns, for each data stream, a set of adjacent allocated memory areas to store all data of the corresponding data blocks such that sets having adjacent memory areas are assigned to the data streams in an order of the data streams defined by a descending number of frames containing a data block of the respective data stream;
(c) stores the data of each received data block at the assigned memory areas of the storage component as each data block is received; and
(d) de-allocates the set of memory areas assigned to each data stream, after the stored data stream is retrieved, such that the sets of memory areas are de-allocated in the reverse order they were assigned to the data streams.

2. The storage apparatus of claim 1, wherein:
the control component performs operations (a) and (b), upon receiving each of a plurality of frames, for all newly received data streams, which are each indicated by identification information within a first-received data block of the newly-received data stream, and
performs operations (c) and (d) for the newly received data streams.

3. A storage method for storing a plurality of received data streams, each data stream comprising a plurality of data blocks that are distributed over and transmitted in a plurality of frames, the storage method comprising:
(a) allocating adjacent memory areas of a storage component to store all data of the plurality of data streams;
(b) assigning, for each data stream, a set of adjacent allocated memory areas to store all data of the corresponding data blocks such that sets having adjacent memory areas are assigned to the data streams in an order of the data streams defined by a descending number of frames containing a data block of the respective data stream;
(c) storing the data of each received data block at the assigned memory areas of the storage component as each data block is received; and
(d) de-allocating the set of memory areas assigned to each data stream, after the stored data stream is retrieved, such that the sets of memory areas are de-allocated in the reverse order they were assigned to the data streams.

4. The storage method of claim 3, further comprising:
performing operations (a) and (b), upon receiving each of a plurality of frames, for all newly received data streams, which are each indicated by identification information within a first-received data block of the newly-received data stream, and
performing operations (c) and (d) for the newly received data streams.

* * * * *